July 27, 1965   A. MARINI   3,196,797
DYNAMIC THRUST ELECTROMAGNETIC COMPRESSOR, PARTICULARLY
SUITABLE FOR COMPRESSING LIQUID OR GASEOUS SUBSTANCES
Filed March 19, 1962   2 Sheets-Sheet 1
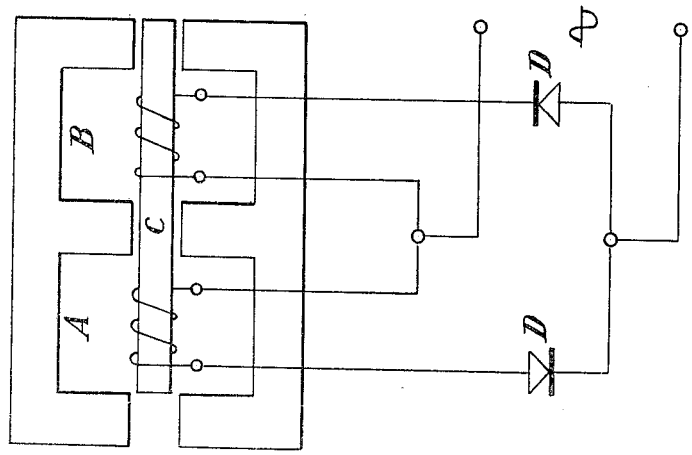
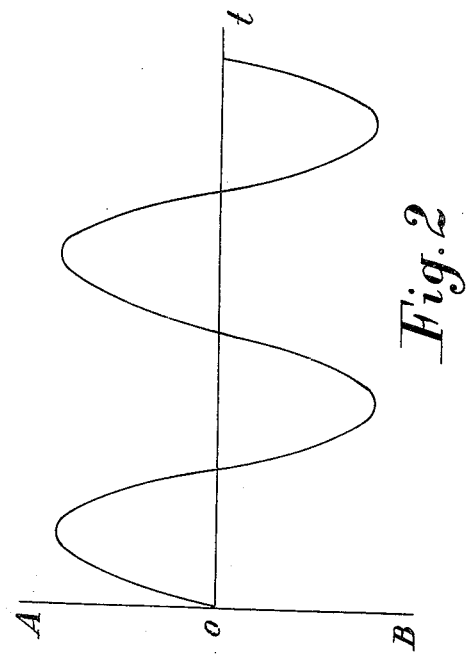
ALDO MARINI
INVENTOR.

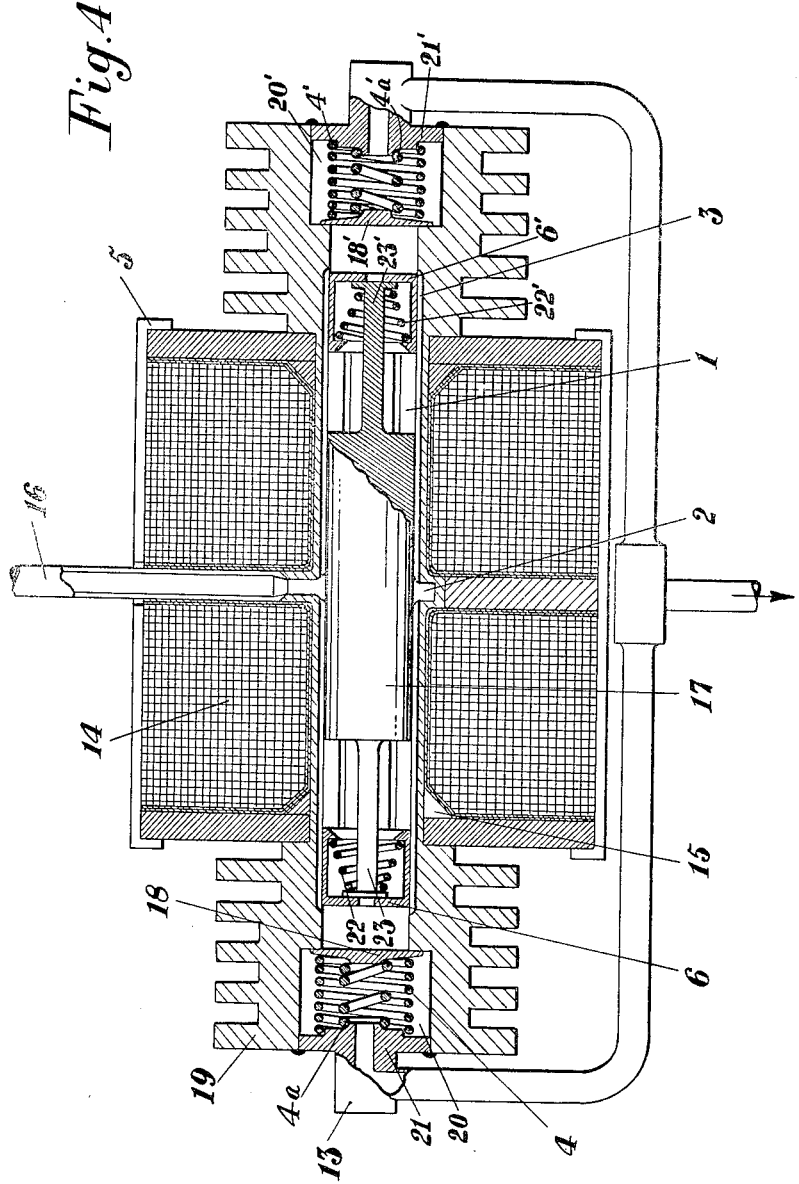

United States Patent Office 3,196,797
Patented July 27, 1965

3,196,797
DYNAMIC THRUST ELECTROMAGNETIC COMPRESSOR, PARTICULARLY SUITABLE FOR COMPRESSING LIQUID OR GASEOUS SUBSTANCES
Aldo Marini, Rome, Italy, assignor to Mario Pagano S.p.A. Gelbyson, Rome, Italy
Filed Mar. 19, 1962, Ser. No. 180,766
Claims priority, application Italy, Sept. 18, 1961, 16,827/61
3 Claims. (Cl. 103—53)

The present invention relates to a compressor consisting essentially of an electromagnetic system with no rotary member, and able to compress liquid or gaseous substances.

Particularly, the study of this system is due essentially to economic factors with respect to the common units consisting of the mechanical units comprising an electric motor and a compressor.

Besides the economic features, the compressor according to this invention has also functional features among which it must be evidenced that:

(a) It requires no particular starting system;
(b) It takes up, when started, no greater power than in service conditions;
(c) It has an electro-mechanical efficiency greater than the conventional motor-compressor units.

This invention will be hereinafter described with reference to the attached drawings showing only by way of non-limitative example, one preferred embodiment of the invention.

In the drawings:

FIGURES 1 and 2 graphically show the principle on which the invention is grounded;

FIGURE 3 is a diagrammatical representation of the functional principle of the compressor;

FIGURE 4 is a cross-sectional view of a compressor according to this invention.

This invention is grounded on the principle as follows:

Considering two forces arranged in position opposite to each other (FIG. 1); should be equal the values of the forces A and B, the point C would remain stationary in the space.

When one of the two values of either A or B will change, the point C will move in the space into the direction of the force having a greater value, and the same effect will be obtained if through a determined duraction either of the forces will be discontinued.

If the forces acting on the point C will change according to an alternating law, i.e. if when the force A will be present, the force B will be discontinued, and vice-versa, as shown in the function of FIG. 2, the point C will move in the space according to a reciprocatory law following the same function as in FIGURE 2.

The essential reason of this study is that of exploiting for the intended purpose the alternating current electric power of the common distribution networks at 50–60 cycles per second, in order to cause a relatively high mass body to reciprocate, without having recourse to particular electric transformations, and particularly with no restraint due to conditions of intrinsic resonance of the reciprocating mass.

Certain studies of this kind have been carried out using as reciprocating mass elements, permanent magnets which, however do limit the power and the amplitude of the reciprocation.

The operating principle of this system has been diagrammatically shown in FIG. 3.

It comprises two electric circuits and two magnetic circuits; when feeding by an alternating current source the two coils A and B, through two mono-directional diodes D, push pull mounted in series with the coils, through an entire cycle of the feeding current the coil A will be passed through by the current while and only when, the positive semiperiod is present and the iron core C will then move towards the energized coil; the reverse operation will be obtained when the subsequent negative semiperiod will occur energizing the coil B and de-energizing the coil A so that the iron core will move towards the coil B.

In order to obtain the maximum amplitude it will be necessary to connect the coils so as to obtain magnetic fields having opposite polarities.

A continuous reciprocation of the core C will be thereby obtained with a frequency equalling that of the feeding current.

FIG. 4 is a cross sectional view of a type of compressor for liquid or gaseous substances embodied according to the above described operative principle.

The cylinder 1 is a bronze casting in order to have a sufficient strength against sliding friction; furthermore it is submitted to unidirectional pulsating fields and the thermal dissipations due to Foucault effect are practically negligible.

At the center of the cylinder 1 an internally hollow ring 2 is provided in order to allow the connection of the suction intake.

This embodiment has been devised in order to admit at the center of the system the inlet of cooler fluids contaminated with oil in order to obtain a sufficient lubrication and in the meantime also the cooling of the core 17.

During the reciprocation it is obvious to note, in this connection, that the system is practically free from sliding frictions as the forces acting between the core and the cylinder are longitudinal forces.

Inside the cylinder 1 are lengthwise arranged the channels 3 allowing the passage of the fluid up to the point where the piston 6 has moved through one half of its stroke.

Should the piston 6 have to compress the fluid throughout its stroke, it would not be possible to obtain sufficiently high pressures as, having the piston 6 the same diameter as the core and haivng a determined surface, the magnetic force even at the saturation limit would not be sufficient to overcome the pressure exerted by the fluid on the piston limiting thus the stroke and originating a harmful space. In order to obviate this drawback, which occurs only when it is desired to obtain pressures higher than those permitted by the magnetic force, two solutions have been devised.

The first solution is that of making the compression chambers with a diameter smaller than that of the core, however these chambers require a more complete machining of the system and a greater precision in the components thereof.

The second solution is that shown in FIG. 4 according to which the core moves idly through one half of its stroke whereby the kinetic energy thus stored will be supplied in the second compressive stage; it is to be noted that the ratios value of compression and volume flow are equal for either solution. In the second solution the value of one half of the idle stroke has been cited only by way of example and of course it could take any value depending upon the application of the compressor.

The heads of the cylinder consists each of a chamber 20 or 20' having a cylinder shape with a diameter greater than the inner diameter of the same cylinder and closed by an outside welded disc 21 or 21' respectively. Inside the head are located: the seal valve consisting of a tempered steel disc 18 or 18' which is pushed by two spiral springs 4 or 4a and 4' or 4a', respectively bearing on its rearside. The functions of the two springs are: the inner spring 4a or 4a' respectively has a greater resistance to compressive stress and when at rest said spring does not bear against the seal disc. This spring serves to define the amplitude of reciprocation of the system, particularly when the compression pressures are low pressures. The outer spring 4 or 4' respectively serves the purpose of slightly compressing the seal disc 18 or 18' respectively.

To the cylinder head is connected the pipe 13 connecting the two outlets of the compressor to a suitable central coupling.

The inner space of the head is sufficient to compensate the maximum pressures issuing from the seal valve.

At the ends of the cylinder are further located and radially mounted the cooling wings 19 of the compression chambers.

The reciprocating core 17 consists of a steel body having a cylinder shape. Its magnetic features have been particularly studied in order to enable to obtain the maximum reciprocation amplitude.

The magnetic hysteresis cycle of the core must be as wide as possible; the medium steel with a little percent of silicon has proved to be one among the best materials.

At the ends of the core are located the compression pistons 6 which are not rigid with the core support, and this in order to avoid any sliding friction if the cylinder should undergo any deflection having a thermal character. The pistons 6 have a cylindrical shape. At their center a bore is made for the passage of the fluids; during the return stroke, said piston will remain connected to the core support by a frusto-conical spring 22 or 22' respectively which pushes the piston against the core stem 23 or 23' respectively by a low static pressure and a high dynamic pressure.

The function of the valve in this system is limited only to release the piston from the moment of the return stroke until the compression chamber will communicate with the channels 3 of the cylinder. From this point the equilibrium of pressures between the compression chamber and the suction side will be reached.

The magnetic circuit consists of the cylinder enclosing the two energizing coils and the windings are in turn magnetically closed on one another with half-circles on either side, the half circles located at the center of the system having an inner diameter equalling the outer diameter of the cylinder, while the iron half-circles located at the ends have a greater and are inside provided with two further half circles 15 having a cone shape, and this in order to concentrate as much as possible the magnetic force in the core pushing stage during the compression.

The windings 14 are so dimensioned as to obtain a 1000–1200 ampere turn value for each square centimetre of the cross-sectional area of the core, and the current density is not greater than 3 amperes for square millimetre, while their Joule dissipation does not overcome 30% of the total taken up power.

It has been proved that the compressor according to this invention is completely fluid tight in its mechanical portion, while the electric portion remains accessible, whereby this compressor is particularly suitable for refrigerating units which require mainly this particular feature. Further, this compressor has another very important feature, i.e. it is capable of operating in oil bath, obtaining thus a uniform thermal dissipation and a remarkable diminution of the encumbrance.

The suction is embodied by a copper pipe 16 connected to the suction chamber which is located, as aforesaid, at the center of the axis of the cylinder.

It has been pointed out that the greatest dissipation of this system is due to the Joule effect of the energizing coils. This power amounts to about 30% of the power taken up by the compressor; the losses of the magnetic circuit amount to 6%, the friction losses amount to about 4%; accordingly the efficiency: electric power taken up-mechanical power present at the pistons will be about 60%; it is possible to note then that this system has an electromechanical efficiency higher than the common motor-operated compressors.

By way of information it is possible to state that the compressor according to this invention represents an inductive circuit and its power factor is about 0.55. The electromagnetic compressor can be fed with direct current through a group converting the current from direct to alternating current.

The powers of the compressor according to this invention are not limited. It can be embodied with any power and the dimensioning thereof must be calculated taking as base the dimensions of the core, the length of which will be proportionally calculated.

As aforesaid at the start of this description, the most important feature of this compressor is the economy of the system.

Obviously this factor depends mainly upon the number of elements composing the compressor and their machining difficulties, and in this case the elements having different forms are about 25, where 50% is obtained by a cold pressing while the remaining 50% is obtained by an automatic machining and this unlike the conventional groups motor-compressor where the elements are about 150–200 and about 30% thereof is cold pressed while the remaining 70% is machined.

A cursory study showed that the cost of the electromagnetic compressor will amount to about ⅓ of the motor compressor groups.

The present invention has been disclosed and shown in one preferred embodiment, being however understood that constructive changes could be practically adopted without departing from the scope of the present industrial privilege.

I claim:

1. An electromagnetic compressor comprising a cylinder having two counterposed compression chambers, a passage from each end of said cylinder to its associated compression chamber, a core slidably mounted in said cylinder, a piston mounted at each end of said core also slidable in said cylinder cooperating with said compression chambers, a valve controlling each of said passages, a pair of solenoids mounted upon said cylinder to reciprocate said core and said pistons by means of alternating current fed through two unidirectional rectifiers, channels in said cylinder to allow the passage of the fluid to be compressed up to a point where each piston has moved through a certain stroke, a central manifold, and an admission duct connecting said manifold to said channels.

2. An electromagnetic compressor comprising a cylinder having two counterposed compression chambers, a passage from each end of said cylinder to its associated compression chamber, a core slidably mounted in said cylinder, a piston mounted at each end of said core also slidable in said cylinder cooperating with said compression chambers, a valve controlling each of said passages, a pair of solenoids mounted upon said cylinder to reciprocate said core and said pistons by means of alternating current fed through two unidirectional rectifiers, each piston being connected to said core by a stem fixed to said core, elastic mounting means interposed between said piston and stem, said elastic mounting means comprise a frusto-conical helical spring, each piston having a peripheral inner projecting ring and each stem having a disc at the end thereof and said helical spring being compressed between said ring and said disc.

3. An electromagnetic compressor comprising a cylinder having two counterposed compression chambers, a passage from each end of said cylinder to its associated compression chamber, a core slidably mounted in said cylinder, a piston mounted at each end of said core also slidable in said cylinder cooperating with said compression chambers, a valve controlling each of said passages, a pair of solenoids mounted upon said cylinder to reciprocate said core and said pistons by means of alternating current fed through two unidirectional rectifiers, each piston being connected to said core by a stem fixed to said core, elastic mounting means interposed between said piston and stem, said elastic mounting means comprise a frusto-conical helical spring, each piston having a peripheral inner projecting ring and each stem having a disc at the end thereof and said helical spring being compressed between said ring and said disc, said disc bearing against a suction passage provided in said piston.

References Cited by the Examiner

UNITED STATES PATENTS

| | | | |
|---|---|---|---|
| 1,334,073 | 3/20 | Bery | 230—228 |
| 2,154,627 | 4/39 | Knobel | 318—125 |
| 2,790,597 | 4/57 | Turpin | 230—228 X |
| 2,832,919 | 4/58 | Reutter | 230—55 |

FOREIGN PATENTS 719,022  3/42  Germany.

LAURENCE V. EFNER, *Primary Examiner.*

ROBERT M. WALKER, JOSEPH H. BRANSON, Jr.,
*Examiners.*